United States Patent
Li et al.

(10) Patent No.: US 11,579,013 B2
(45) Date of Patent: Feb. 14, 2023

(54) FLEXIBLE INTEGRATED COMPUTATIONAL ELEMENTS FOR OPTICAL ANALYSIS

(71) Applicant: Halliburton Energy Services, Inc., Houston, TX (US)

(72) Inventors: Jian Li, Houston, TX (US); James M. Price, Woodlands, TX (US); Bin Dai, Spring, TX (US); Christopher M. Jones, Katy, TX (US); Daniel Stark, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 27 days.

(21) Appl. No.: 16/769,771

(22) PCT Filed: Mar. 6, 2018

(86) PCT No.: PCT/US2018/021195
§ 371 (c)(1),
(2) Date: Jun. 4, 2020

(87) PCT Pub. No.: WO2019/172896
PCT Pub. Date: Sep. 12, 2019

(65) Prior Publication Data
US 2021/0172792 A1    Jun. 10, 2021

(51) Int. Cl.
*G01J 1/04* (2006.01)
*G01N 21/31* (2006.01)
(Continued)

(52) U.S. Cl.
CPC ............ *G01J 1/0488* (2013.01); *G01N 21/31* (2013.01); *G01N 21/85* (2013.01); *G02B 5/285* (2013.01)

(58) Field of Classification Search
CPC .......... G01J 1/0488; G01J 1/04; G01J 1/0492; G01J 3/28; G01J 3/453; G01J 3/4531; G01N 21/31; G01N 21/25; G01N 21/27; G01N 2021/3185; G01N 2021/3188; G01N 21/85; G01N 21/8507; G02B 5/285;
(Continued)

(56) References Cited

U.S. PATENT DOCUMENTS 6,198,531 B1 *   3/2001   Myrick ..................... G01J 3/28
                                                          356/300
8,350,233 B2    1/2013   Ferrini et al.
(Continued)

FOREIGN PATENT DOCUMENTS

WO   2013-160008 A1   10/2013
WO   2015-142353 A1    9/2015
WO   2015-171146 A1   11/2015

OTHER PUBLICATIONS

International Search Report and Written Opinion dated Oct. 17, 2018; International PCT Application No. PCT/US2018/021195.

*Primary Examiner* — John R Lee
(74) *Attorney, Agent, or Firm* — McGuireWoods LLP (57) ABSTRACT

An integrated computing element for an optical computing device includes a flexible optical substrate. The integrated computing element also includes at least one optical thin film deposited on a first surface of the flexible optical substrate. The at least one optical thin film is configured to selectively pass fractions of electromagnetic radiation at different wavelengths.

19 Claims, 5 Drawing Sheets

(51) Int. Cl.
 *G01N 21/85* (2006.01)
 *G02B 5/28* (2006.01)

(58) Field of Classification Search
 CPC .......... G02B 5/288; G02B 5/28; G02B 26/08; H01L 31/032; H01L 33/00; G03F 7/20; H05B 33/00
 See application file for complete search history.

(56) References Cited

U.S. PATENT DOCUMENTS

| | | |
|---|---|---|
| 9,733,183 B2 | 8/2017 | Perkins et al. |
| 2013/0284900 A1* | 10/2013 | Freese .................... G01N 21/17 250/208.2 |
| 2016/0027938 A1 | 1/2016 | Stoica et al. |
| 2016/0054285 A1* | 2/2016 | Freese .................... G01N 21/27 356/70 |
| 2016/0076367 A1* | 3/2016 | Freese .................... E21B 47/113 356/402 |
| 2016/0273911 A1* | 9/2016 | Jamison ................. G01B 11/16 |
| 2016/0282509 A1* | 9/2016 | Perkins ............. C23C 16/45525 |
| 2017/0241839 A1 | 8/2017 | Perkins |
| 2017/0284931 A1 | 10/2017 | Perkins et al. |
| 2020/0370425 A1* | 11/2020 | Perkins ................ G03H 1/0443 |
| 2021/0172792 A1* | 6/2021 | Li .......................... G01N 21/31 |

* cited by examiner

FLEXIBLE INTEGRATED COMPUTATIONAL ELEMENTS FOR OPTICAL ANALYSIS

BACKGROUND

The disclosure generally relates to optical processing elements. More specifically, the disclosure relates to a flexible integrated computational element used in an optical computing device.

Optical computing devices, also commonly referred to as "opticoanalytical devices," can be used to analyze and monitor a sample substance in real time. Such optical computing devices often employ a light source that emits electromagnetic radiation that reflects from or is transmitted through the sample and optically interacts with an optical processing element to determine quantitative and/or qualitative values of one or more physical or chemical properties of the substance being analyzed. The optical processing element may be, for example, an integrated computational element, or integrated computing element (ICE). An embodiment of an ICE is an optical thin film interference device, also known as a multivariate optical element (MOE). Each ICE can be designed to operate over a continuum of wavelengths in the electromagnetic spectrum from the UV to mid-infrared (MIR) ranges, or any sub-set of that region. Electromagnetic radiation that optically interacts with the sample substance is changed and processed by the ICE so as to be measured by a detector as a unique transmission profile. The output of the detector can be correlated to a physical or chemical property of the substance being analyzed based on the detected unique transmission profile.

An ICE typically includes a plurality of optical thin film layers consisting of various materials whose index of refraction and size (e.g., thickness) may vary between each layer. An ICE design refers to the substrate, the number and thickness of the respective layers, and the refractive indices of each layer of the ICE. The layers may be strategically deposited and sized so as to selectively pass predetermined fractions of electromagnetic radiation at different wavelengths configured to substantially mimic a regression vector corresponding to a particular physical or chemical property of interest of a substance of interest. Accordingly, an ICE design will exhibit a transmission function that is weighted with respect to wavelength. As a result, the output light intensity from the ICE conveyed to the detector may be related to the physical or chemical property of interest for the substance.

Because ICEs typically include a glass or other inflexible and difficult to machine bulk substrates, it may be difficult or costly to appropriately shape the ICEs for use with an optical computing element. Additionally, the inflexible substrates may limit a lower range of sizes for the ICEs.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the disclosed subject matter, and it is understood that other embodiments may be utilized and that logical structural, mechanical, electrical, and chemical changes may be made without departing from the spirit or scope of the disclosure. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Moreover, even though a figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a figure may depict an onshore operation, it should be understood by those skilled in the art that the apparatus according to the present disclosure is equally well suited for use in offshore operations and vice-versa. Further, unless otherwise noted, even though a figure may depict a cased hole, it should be understood by those skilled in the art that the apparatus according to the present disclosure is equally well suited for use in open hole operations and vice versa.

The present disclosure is related to optical processing elements and, in particular, methods of manufacturing or fabricating an integrated computational element for use in an optical computing device. The present disclosure describes improved methods of manufacturing optical processing elements, such as ICEs. In some embodiments, the several thin film layers that combine to make up an ICE are deposited on flexible optical substrates during an atomic layer deposition (ALD) process. The resulting multilayer film stack and flexible substrate may be easily sized, cut, and positioned to fit unconventionally sized or shaped elements. Accordingly, the disclosed embodiments may prove advantageous in enhancing customization of ICEs during an ALD process and using the resulting ICEs as a type of tape that can be selectively arranged on a target surface.

The methods disclosed herein may be suitable for fabricating optical processing elements (e.g., ICEs) for use in the oil and gas industry, such as for monitoring and detecting oil/gas-related substances (e.g., hydrocarbons, drilling fluids, completion fluids, treatment fluids, etc.). It will be appreciated, however, that the methods described herein are equally applicable to fabricating ICEs for use in other technology fields including, but not limited to, the food industry, the paint industry, the mining industry, the agricultural industry, the medical and pharmaceutical industries, the automotive industry, the cosmetics industry, water treatment facilities, and any other field where it may be desired to monitor substances in real time.

As used herein, the term "characteristic" or "characteristic of interest" may refer to a chemical, mechanical, or physical property of a substance or a sample of the substance. The characteristic of a substance may include a quantitative or qualitative value of one or more chemical constituents or compounds present therein or any physical property associated therewith. Such chemical constituents and compounds may be referred to herein as "analytes." Illustrative characteristics of a substance that can be analyzed with the help of the optical processing elements described herein can include, for example, chemical composition (e.g., identity and concentration in total or of individual components), phase presence (e.g., gas, oil, water, etc.), impurity content, pH, alkalinity, viscosity, density, ionic strength, total dissolved solids, salt content (e.g., salinity), porosity, opacity, bacteria content, total hardness, transmittance, state of matter (solid, liquid, gas, emulsion, mixtures thereof, etc.), and the like.

As used herein, the term "substance," or variations thereof, may refer to at least a portion of matter or material of interest to be tested or otherwise evaluated with the help of the optical processing elements described herein. The substance may be any fluid capable of flowing, including particulate solids, liquids, gases (e.g., air, nitrogen, carbon dioxide, argon, helium, methane, ethane, butane, and other hydrocarbon gases, hydrogen sulfide, and combinations thereof), slurries, emulsions, powders, muds, glasses, mixtures, combinations thereof, and may include, but is not limited to, aqueous fluids (e.g., water, brines, etc.), non-aqueous fluids (e.g., organic compounds, hydrocarbons, oil, a refined component of oil, petrochemical products, and the like), acids, surfactants, biocides, bleaches, corrosion inhibitors, foamers and foaming agents, breakers, scavengers, stabilizers, clarifiers, detergents, treatment fluids, fracturing fluids, formation fluids, or any oilfield fluid, chemical, or substance commonly found in the oil and gas industry. The substance may also refer to solid materials such as, but not limited to, rock formations, concrete, solid wellbore surfaces, pipes or flow lines, and solid surfaces of any wellbore tool or projectile (e.g., balls, darts, plugs, etc.).

As used herein, the term "electromagnetic radiation" may refer to radio waves, microwave radiation, terahertz, infrared and near-infrared radiation, visible light, ultraviolet light, X-ray radiation and gamma ray radiation.

As used herein, the term "optically interact" or variations thereof may refer to the reflection, transmission, scattering, diffraction, or absorption of electromagnetic radiation either on, through, or from an optical processing element (e.g., an integrated computational element) or a substance being analyzed with the help of the optical processing element. Accordingly, optically interacted light refers to electromagnetic radiation that has been reflected, transmitted, scattered, diffracted, or absorbed by, emitted, or re-radiated, for example, using an optical processing element, but may also apply to optical interaction with a substance.

As used herein, the term "optical computing device" may refer to an optical device that is configured to receive an input of electromagnetic radiation associated with a substance and produce an output of electromagnetic radiation from an optical processing element arranged within or otherwise associated with the optical computing device. The optical processing element may be, for example, an integrated computational element (ICE). The electromagnetic radiation that optically interacts with the optical processing element is changed so as to be readable by a detector, such that an output of the detector can be correlated to a particular characteristic of the substance being analyzed. The output of electromagnetic radiation from the optical processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, phosphorescence, thermal radiance, Raman, Mie, and/or Raleigh scattering, can also be monitored by optical computing devices.

As indicated above, the present disclosure provides improved methods of manufacturing or fabricating optical processing elements, such as integrated computational elements (ICEs), for use in optical computing devices. Additionally, the present disclosure provides an improved composition of the optical computing devices. In operation, an ICE is capable of distinguishing electromagnetic radiation related to a characteristic of interest of a substance from electromagnetic radiation related to other components of the substance.

Figure 1:
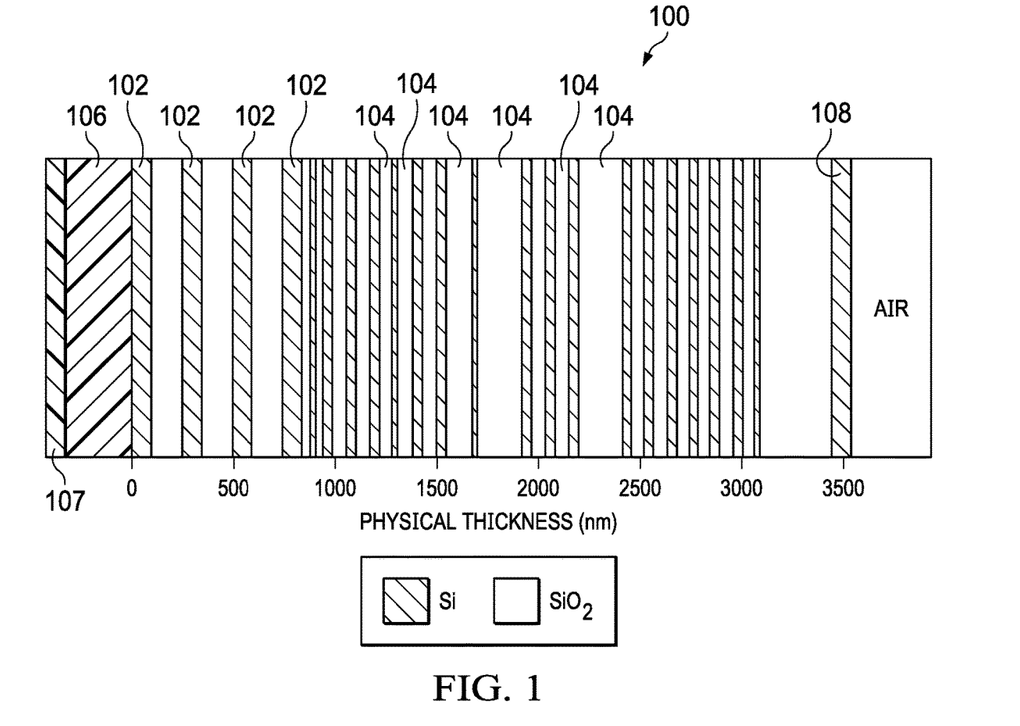
FIG. 1 is a sectional view of an embodiment of an integrated computing element, in accordance with an embodiment of the disclosure.

Referring to FIG. 1, illustrated is an exemplary ICE 100 that may be fabricated using the presently disclosed methods, according to one or more embodiments. As illustrated, the ICE 100 may include a plurality of alternating thin film layers 102 and 104, such as silicon (Si) and $SiO_2$ (quartz), respectively. In general, these layers 102, 104 consist of materials whose index of refraction is high and low, respectively. Other examples of materials might include niobia and niobium, germanium and germania, MgF, SiO, $TiO_2$, $Al_2O_3$, and other suitable high and low index materials. The layers 102, 104 may be strategically deposited on a flexible optical substrate 106. In an embodiment, the flexible optical substrate 106 is a polyimide film capable of withstanding harsh environments. In other embodiments, the flexible optical substrate 106 may be a flexible glass substrate or any other flexible optical substrate. Further, the flexible optical substrate 106, in an embodiment, may include an adhesive layer 107 on a side opposite the layers 102, 104 such that the ICE 100 is attachable to an optical element (not shown) capable of measuring electromagnetic radiation that passes through the ICE 100. Further, the adhesive layer 107 may be easily removed from the optical element to replace worn ICEs 100 or to replace an ICE 100 with a different ICE 100 with different measurement capabilities. However, it may be appreciated that the adhesive layer 107 may not be present on the flexible optical substrate 106, and the ICE 100 may be attached to an optical element with other adhesive techniques such as electrostatic adhesion, magnetic adhesion, or other adhesives applied to the flexible optical substrate 106 after fabrication of the ICE 100. Further, while the flexible optical substrate 106 is described as an "optical" substrate, in a reflection multivariate optical element (MOE), the flexible substrate 106 may be fully opaque.

At the opposite end (e.g., opposite the flexible optical substrate 106 in FIG. 1), the ICE 100 may include a layer 108 that is generally exposed to the environment of the device or installation, and may be able to detect a sample substance. The number of layers 102, 104 and the thickness of each layer 102, 104 are determined from the spectral attributes acquired from a spectroscopic analysis of a characteristic of the substance being analyzed using a conventional spectroscopic instrument. The spectrum of interest of a given characteristic typically includes any number of different wavelengths.

It should be understood that the ICE 100 depicted in FIG. 1 is not representative of a particular ICE configuration to detect a specific characteristic of a given substance, but is provided for purposes of illustration only. Consequently, the number of layers 102, 104 and their relative thicknesses, as shown in FIG. 1, bear no correlation to any particular substance or characteristic thereof. Nor are the relative thicknesses of the layers 102, 104, 108 and the flexible optical substrate 106 drawn to scale, and therefore should not be considered limiting of the present disclosure.

In some embodiments, the material of each layer 102, 104 can be doped or two or more materials can be combined in a manner to achieve the desired optical characteristic. In addition to solids, the exemplary ICE 100 may also contain liquids and/or gases, optionally in combination with solids, to produce a desired optical characteristic. In the case of gases and liquids, the ICE 100 can contain a corresponding vessel (not shown), which houses the gases or liquids. An embodiment of the ICE 100 may also include holographic optical elements, gratings, piezoelectric, light pipe, and/or acousto-optic elements, for example, that can create transmission, reflection, and/or absorptive properties of interest.

The multiple layers 102, 104 may exhibit different refractive indices. By properly selecting the materials of the layers 102, 104 and their relative thickness and spacing, the ICE 100 may selectively transmit or reflect predetermined fractions of electromagnetic radiation at different wavelengths. Each wavelength is given a predetermined weighting or loading factor. The thickness and spacing of the layers 102, 104 may be determined using a variety of approximation methods from the spectrum of the characteristic or analyte of interest. These methods may include inverse Fourier transform (IFT) of the optical transmission spectrum and structuring the ICE 100 as the physical representation of the IFT. The approximations convert the IFT into a structure based on known materials with constant refractive indices.

The weightings that the layers 102, 104 of the ICE 100 apply at each wavelength are set to the regression weightings described with respect to a known equation, or data, or spectral signature. For instance, when electromagnetic radiation interacts with a substance, unique physical and chemical information about the substance is encoded in the electromagnetic radiation that is reflected from, transmitted through, or radiated from the substance. This information is often referred to as the spectral "fingerprint" of the substance. The ICE 100 may be configured to perform the dot product of the received electromagnetic radiation and the wavelength dependent transmission function of the ICE 100. The wavelength dependent transmission function of the ICE 100 is dependent on the material refractive index of each layer, the number of layers 102, 104 and thickness of each layer 102, 104. As a result, the output light intensity of the ICE 100 is related to the characteristic or analyte of interest.

As a further explanation, accurately determining the regression vector of the characteristic of interest in the sample substance provides a means for an optical computing device to estimate or otherwise calculate a concentration of said characteristic in the sample substance. The regression vector for each characteristic may be determined using standard procedures that will be familiar to one having ordinary skill in the art. For example, analyzing the spectrum of the sample substance may include determining a dot product of the regression vector for each characteristic of the sample substance being analyzed. As one of ordinary skill in art will recognize, a dot product of a vector is a scalar quantity {i.e., a real number). While the dot product value is believed to have no physical meaning by itself (e.g., it may return a positive or negative result of any magnitude), comparison of the dot product value of a sample substance with dot product values obtained for known reference standards and plotted in a calibration curve may allow the sample substance dot product value to be correlated with a concentration or value of a characteristic, thereby allowing unknown sample substances to be accurately analyzed.

To determine the dot product, one simply multiplies the regression coefficient of the regression vector at a given wavelength by the spectral intensity at the same wavelength. This process is repeated for all wavelengths analyzed, and the products are summed over the entire wavelength range to yield the dot product. Those skilled in the art will recognize that two or more characteristics may be determined from a single spectrum of the sample substance by applying a corresponding regression vector for each characteristic.

In practice, it is possible to derive information from electromagnetic radiation interacting with a sample substance by, for example, separating the electromagnetic radiation from several samples into wavelength bands and performing a multiple linear regression of the band intensity against a characteristic of interest determined by another measurement technique for each sample substance. The measured characteristic may be expressed and modeled by multiple linear regression techniques that will be familiar to one having ordinary skill in the art. Specifically, if y is the measured value of the concentration or characteristic, y may be expressed as in Equation 1:

$$y = a_0 + a_1 w_1 + a_2 w_2 + a_3 w_3 + a_4 w_4 \qquad \text{Equation (1)}$$

where each 'a' is a constant determined by the regression analysis and each 'w' is the light intensity for each wavelength band. Depending on the circumstances, the estimate obtained from Equation (1) may be inaccurate, for example, due to the presence of other characteristics within the sample substance that may affect the intensity of the wavelength bands. A more accurate estimate may be obtained by expressing the electromagnetic radiation in terms of its principal components.

To obtain the principal components, spectroscopic data is collected for a variety of similar sample substances using the same type of electromagnetic radiation. For example, following exposure to each sample substance, the electromagnetic radiation may be collected and the spectral intensity at each wavelength may be measured for each sample substance. This data may then be pooled and subjected to a linear-algebraic process known as singular value decomposition (SVD) in order to determine the principal components. Use of SVD in principal component analysis will be well understood by one having ordinary skill in the art.

Briefly, however, principal component analysis is a dimension reduction technique that takes 'm' spectra with independent variables and constructs a new set of eigenvectors that are linear combinations of the original variables. The eigenvectors may be considered a new set of plotting axes. The primary axis, termed the first principal component, is the vector that describes most of the data variability. Subsequent principal components describe successively less sample variability, until the higher order principal components essentially describe only spectral noise.

Typically, the principal components are determined as normalized vectors. Thus, each component of an electromagnetic radiation sample may be expressed as $x_n z_n$, where $x_n$ is a scalar multiplier and $z_n$ is the normalized component vector for the $n^{th}$ component. That is, $z_n$ is a vector in a multi-dimensional space where each wavelength is a dimension. Normalization determines values for a component at each wavelength so that the component maintains its shape and the length of the principal component vector is equal to one. Thus, each normalized component vector has a shape and a magnitude so that the components may be used as the basic building blocks of any electromagnetic radiation sample having those principal components. Accordingly, each electromagnetic radiation sample may be described by a combination of the normalized principal components multiplied by the appropriate scalar multipliers, as set forth in Equation (2):

$$x_1 z_1 + x_2 z_2 + \ldots + x_n z_n \quad \text{Equation (2)}$$

The scalar multipliers $x_n$ may be considered the "magnitudes" of the principal components in a given electromagnetic radiation sample when the principal components are understood to have a standardized magnitude as provided by normalization.

Because the principal components are orthogonal, they may be used in a relatively straightforward mathematical procedure to decompose an electromagnetic radiation sample into the component magnitudes, which may accurately describe the data in the original electromagnetic radiation sample. Since the original electromagnetic radiation sample may also be considered a vector in the multi-dimensional wavelength space, the dot product of the original signal vector with a principal component vector is the magnitude of the original signal in the direction of the normalized component vector. That is, it is the magnitude of the normalized principal component present in the original signal. This is analogous to breaking a vector in a three dimensional Cartesian space into its X, Y and Z components. The dot product of the three-dimensional vector with each axis vector, assuming each axis vector has a magnitude of 1, gives the magnitude of the three dimensional vector in each of the three directions. The dot product of the original signal and some other vector that is not perpendicular to the other three dimensions provides redundant data, since this magnitude is already contributed by two or more of the orthogonal axes.

Because the principal components are orthogonal to each other, the dot product of any principal component with any other principal component is zero. Physically, this means that the components do not interfere with each other. If data is altered to change the magnitude of one component in the original electromagnetic radiation signal, the other components remain unchanged. In the analogous Cartesian example, reduction of the X component of the three dimensional vector does not affect the magnitudes of the Y and Z components.

Principal component analysis provides the fewest orthogonal components that can accurately describe the data carried by the electromagnetic radiation samples. Thus, in a mathematical sense, the principal components are components of the original electromagnetic radiation that do not interfere with each other and that represent the most compact description of the spectral signal. Physically, each principal component is an electromagnetic radiation signal that forms a part of the original electromagnetic radiation signal. Each principal component has a shape over some wavelength range within the original wavelength range. Summing the principal components may produce the original signal, provided each component has the proper magnitude, whether positive or negative.

The principal components may comprise a compression of the information carried by the total light signal. In a physical sense, the shape and wavelength range of the principal components describe what information is in the total electromagnetic radiation signal, and the magnitude of each component describes how much of that information is present. If several electromagnetic radiation samples contain the same types of information, but in differing amounts, then a single set of principal components may be used to describe (except for noise) each electromagnetic radiation sample by applying appropriate magnitudes to the components. The principal components may be used to provide an estimate of the characteristic of the sample substance based upon the information carried by the electromagnetic radiation that has interacted with that sample substance. Differences observed in spectra of sample substances having varying quantities of an analyte or values of a characteristic may be described as differences in the magnitudes of the principal components. Thus, the concentration of the characteristic may be expressed by the principal components according to Equation (3) in the case where four principal components are used:

$$y = a_0 + a_1 x_1 + a_2 x_2 + a_3 x_3 + a_4 x_4 \quad \text{Equation (3)}$$

where y is a concentration or value of a characteristic, each a is a constant determined by the regression analysis, and $x_1$, $x_2$, $x_3$ and $x_4$ are the first, second, third, and fourth principal component magnitudes, respectively. Equation (3) may be referred to as a regression vector. The regression vector may be used to provide an estimate for the concentration or value of the characteristic for an unknown sample.

Regression vector calculations may be performed by computer, based on spectrograph measurements of electromagnetic radiation by wavelength. The spectrograph system spreads the electromagnetic radiation into its spectrum and measures the spectral intensity at each wavelength over the wavelength range. Using Equation (3), the computer may read the intensity data and decompose the electromagnetic radiation sample into the principal component magnitudes $x_n$ by determining the dot product of the total signal with each component. The component magnitudes are then applied to the regression equation to determine a concentration or value of the characteristic.

To simplify the foregoing procedure, however, the regression vector may be converted to a form that is a function of wavelength so that only one dot product is determined. Each normalized principal component vector $z_n$ has a value over all or part of the total wavelength range. If each wavelength value of each component vector is multiplied by the regression constant and corresponding to the component vector, and if the resulting weighted principal components are summed by wavelength, the regression vector takes the form of Equation (4):

$$y = a_0 + b_1 u_1 + b_2 u_2 + \ldots + b_n u_n \quad \text{Equation (4)}$$

where $a_0$ is the first regression constant from Equation (3), $b_n$ is the sum of the multiple of each regression constant an from Equation (3) and the value of its respective normalized regression vector at wavelength, and $u_n$ is the intensity of the electromagnetic radiation at wavelength. Thus, the new constants define a vector in wavelength space that directly describes a concentration or characteristic of a sample substance. The regression vector in the form of Equation (4) represents the dot product of an electromagnetic radiation sample with this vector.

Normalization of the principal components provides the components with an arbitrary value for use during the regression analysis. Accordingly, it is very unlikely that the dot product value produced by the regression vector will be equal to the actual concentration or characteristic value of a sample substance being analyzed. The dot product result is, however, proportional to the concentration or characteristic value. As discussed above, the proportionality factor may be determined by measuring one or more known calibration samples by conventional means and comparing the result to the dot product value of the regression vector. Thereafter, the dot product result can be compared to the value obtained from the calibration standards in order to determine the concentration or characteristic of an unknown sample being analyzed.

Figure 2:
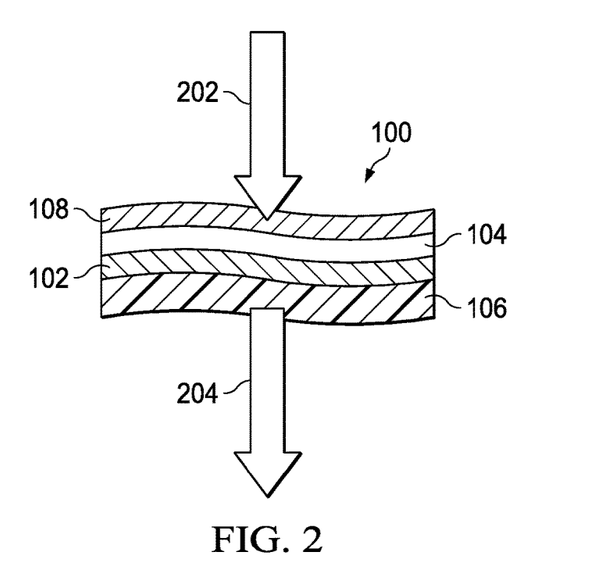
FIG. 2 is a schematic view of operation of the integrated computing element of FIG. 1, in accordance with an embodiment of the disclosure.

FIG. 2 is a schematic view of an operation method of the ICE 100. As illustrated, the ICE 100 receives electromagnetic radiation 202, which has impinged upon and optically interacted with a sample substance, including any components present within the sample substance. As a result, the optically interacted electromagnetic radiation 202 is generated by and reflected from the sample substance. As used herein, the sample substance refers to at least a portion of matter or material of interest to be tested or otherwise evaluated with the help of the ICE 100.

The optically interacted electromagnetic radiation 202 generated by the interaction with the sample substance may be directed to or otherwise be received by an ICE 100. In operation, the ICE 100 may receive the optically interacted electromagnetic radiation 202 and produce modified electromagnetic radiation 204 corresponding to a particular characteristic of the sample substance. In particular, the modified electromagnetic radiation 204 is electromagnetic radiation that has optically interacted with the ICE 100, whereby an approximate mimicking of a regression vector corresponding to the characteristic of the sample substance is obtained.

As illustrated, the optically interacted electromagnetic radiation 202 may first come in contact with the layers 102, 104, and 108 of the ICE 100. The layers 102 and 104 may produce the modified electromagnetic radiation 204, while the layer 108 functions as the layer interacting with the environment. In an embodiment, the layer 108 may also operate along with the layers 102 and 104 to act on the optically interacted electromagnetic radiation 202 to produce the modified electromagnetic radiation 204.

Further, the layers 102, 104, and 108 are positioned on the flexible optical substrate 106. The flexible optical substrate 106 enables the ICE 100 to be positioned on unconventionally shaped parts. For example, a surface of the optical detector may be very small or have an uneven surface, and the ICE 100 that includes the flexible optical substrate 106 may be sized and positioned to cover the optical detector despite these unconventional features. Further, the ICE 100 including the flexible optical substrate 106 may enable implementation of optical computing in situations that forbid conventional optical computing elements. For example, the ICE 100 may be positioned in a tight space of irregular shape, such as between moving parts inside a drilling unit or an engine.

Figure 3:
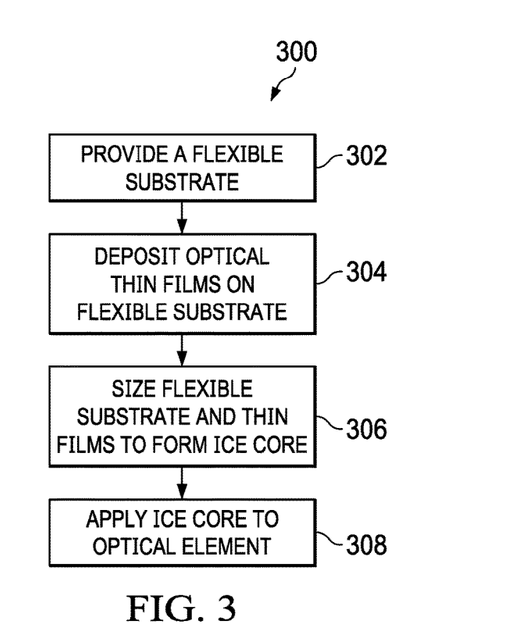
FIG. 3 is a flowchart of a method of manufacturing the integrated computing element of FIG. 1, in accordance with an embodiment of the disclosure.

Turing now to FIG. 3, illustrated is a flowchart of a method 300 of manufacturing the ICE 100. Optical processing elements that result from following the method 300 may be substantially similar to the ICE 100 of FIG. 1, and otherwise useful in analyzing a sample substance for an analyte or characteristic of interest associated with the sample substance.

According to the method 300, the flexible optical substrate 106 for the optical processing element may first be provided at block 302. A suitable flexible optical substrate 106 may be a polyimide film, a polyether ketone film, a polyamide-imide film, a flexible glass substrate, or any other transparent and flexible material that is capable of withstanding a film deposition process. Preferably, the flexible optical substrate 106 exhibits optical properties that are compliant with the optical bandwidth of interest (i.e., significantly flat and high % transmission profile).

In an embodiment, the flexible optical substrate 106 may include an adhesive layer 107 such that the flexible optical substrate 106 may be efficiently attached and/or removed from an optical element. In other embodiments, the flexible optical substrate 106 may not include the adhesive layer 107. In such an embodiment, the flexible optical substrate 106 may be attached to the optical element using an alternative adhesion technique, such as electrostatic adhesion, or the flexible optical substrate 106 may be attached to the optical element using an adhesive applied to the optical element or the ICE 100 after the ICE 100 is formed.

Once the flexible optical substrate 106 is provided, multiple optical thin film layers 102 and 104 may be deposited on the flexible optical substrate 106 via a thin film deposition process to generate a multilayer film stack device (e.g., the ICE 100) at block 304. In an embodiment, the thin film deposition process may be an atomic layer deposition (ALD) process. However, the thin film deposition process may be any chemical or physical thin film deposition technique including, but not limited to, plating, chemical solution deposition, spin coating, chemical vapor deposition, plasma enhanced chemical vapor deposition, physical vapor deposition, sputtering, pulsed laser deposition, cathodic arc deposition, electrohydrodynamic deposition (i.e., electrospray deposition), and ion-assisted e-beam deposition.

In another embodiment, the flexible optical substrate 106 itself may be altered to form an ICE 100 without deposition of the thin film layers 102 and 104. For example, the flexible optical substrate 106 may be altered by implantation or laser treatment. The resulting flexible optical substrate 106 may provide effects on electromagnetic radiation useful for optical computing.

In an embodiment, subjecting the flexible optical substrate 106 to an ALD process, as at block 304, may include introducing the flexible optical substrate 106 into an ALD reaction chamber. The substrate may be positioned within the ALD reaction chamber such that a surface opposite the adhesive layer 107 of the flexible optical substrate 106 is evenly coated during each stage of the deposition process without deposition on the adhesive layer 107.

Once the substrate is suitably arranged within the ALD reaction chamber, the ALD process may then proceed to sequentially (i.e., consecutively) grow the various layers (i.e., layers 102, 104 of FIG. 1) on the flexible optical substrate 106. Briefly, this process includes introducing a first gaseous compound or "precursor" into the ALD reaction chamber to chemically bond to the flexible optical substrate 106; purging or evacuating the ALD reaction chamber to remove any non-reacted precursors and/or gaseous reaction by-products; introducing a second precursor into the ALD reaction chamber to chemically react to the substrate bonded precursor of the previous cycle to form a monolayer; purging or evacuating the ALD reaction chamber to remove any non-reacted precursors and/or gaseous reaction by-products of the second precursor; and repeating the foregoing steps as many times as required for the desired number of layers and the desired thickness of each layer.

Due to self-terminating reactions inherent in ALD processing, ALD is characterized as a surface-controlled process, where the predominant process parameters of control include the precursors (and their flow rates), the substrate, and the ambient temperature inside the ALD reaction chamber. Moreover, because of the surface control that is inherent in ALD processes, the resulting layers deposited on the substrate are extremely conformal and otherwise uniform in thickness on each side of the substrate.

After thin film deposition, sizing the flexible optical substrate 106 and the thin film layers 102, 104 is performed at block 206 to form the ICE 100. In forming the ICE 100, a size of an optical element to which the ICE 100 is applied may be taken into account to determine the desired size of the ICE 100. By way of example, the ICE 100 may be sized to a diameter of approximately 1 mm or smaller. This level of precision may be achieved due to the flexible nature of the flexible optical substrate 106, which avoids shearing or breaking associated with cutting or sizing inflexible substrates. Further, the sizing may be accomplished using simple tools without sending the ICE 100 to an outside vendor for coring.

The method 300 may further include applying the ICEs 100 on an optical element, as at block 308. More particularly, the ICEs 100 resulting from sizing the flexible optical substrate 106 and the thin film layers 102 and 104 may be attached or otherwise adhered to a secondary optical element that either would not have survived the ALD process (or other thin film deposition processes) or would be impractical to place in the ALD reaction chamber. The secondary optical element may be any optical element, device, mechanism, or component that may be used in the optical computing devices described herein, and the ICE may operate therewith in order to determine analytes of interest of a sample substance. For example, the secondary optical element may be, but is not limited to, a sector of a filter wheel, a band pass filter, a lens, a surface of an optical fiber, a sampling window, a sapphire optical element, a non-planar optical element (e.g., the surface of a lamp, light bulb, or other source of electromagnetic radiation), and a detector.

In some embodiments, the ICEs 100 may be manually placed on the secondary optical element. This may be accomplished by hand or with the help of a tool or device, such as pliers, tweezers, or the like. An adhesive may be used to secure the ICE 100 to the target surface. In an embodiment, the adhesive used to secure the ICE 100 is an adhesive layer 107 of the flexible optical substrate 106. In other embodiments, the adhesive may be applied after deposition of the thin films on the flexible optical substrate 106. In some embodiments where the adhesive is applied after formation of the ICE 100, the adhesive may be applied about a periphery of the ICE 100 (as opposed to a central location of the ICE 100) so that light passing through the ICE 100 and the secondary optical element is not adversely affected by the adhesive.

In other embodiments, the ICE 100 may be bonded or otherwise attached to the secondary optical element at the target surface using known sintering, welding, or bonding techniques. Such bonding techniques may include, but are not limited to, low temperature glass frit bonding, glass soldering, seal glass bonding, pressure bonding, and wafer bonding. In such embodiments, the edges of the ICE 100 may be sintered to the target surface. In embodiments where the target surface is made of a low temperature melting glass or plastic, the target surface may be partially melted in order to securely bond the ICE 100 to the secondary optical element.

Figure 4A:
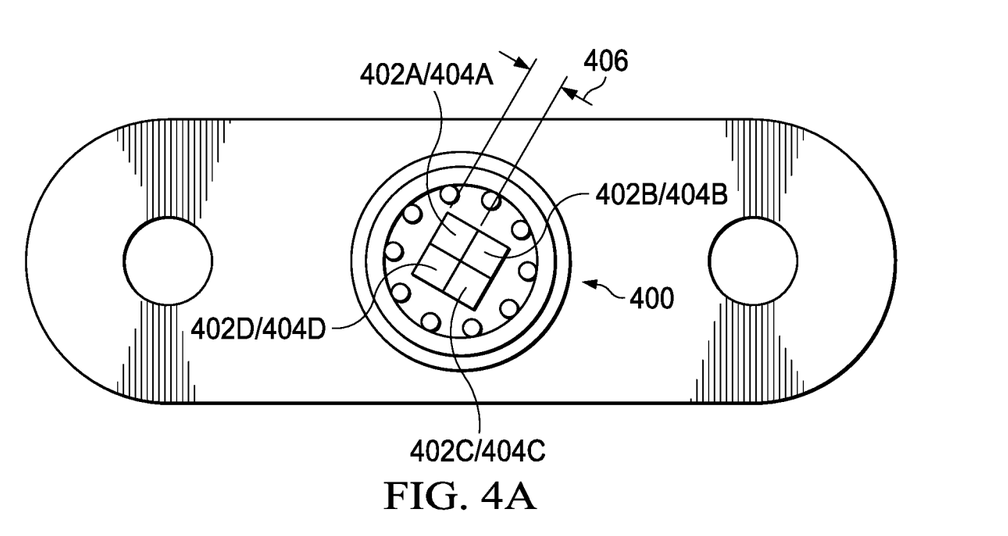
FIG. 4A is a quad detector including integrated computing element measurement areas positioned over active areas of the quad detector, in accordance with an embodiment of the disclosure.

FIG. 4A is a quad detector 400 including ICEs 402A-402D positioned over active areas 404A-404D of the quad detector 400. The quad detector 400 is a type of optical detector that includes four of the active areas 404A-404D. The active areas 404A-404D are each capable of individually detecting electromagnetic radiation. In some embodiments, the active areas 404A-404D of the quad detector 400 may be, but are not limited to, a thermal detector such as a thermopile or photoacoustic detector, a semiconductor detector, a piezo-electric detector, a charge coupled device (CCD) detector, a video or array detector, a split detector, a photon detector (such as a photomultiplier tube), photodiodes, combinations thereof, or any other suitable detectors.

In an embodiment, the quad detector 400 may produce four separate output signals in real-time or near real-time in the form of a voltage (or current) that correspond to particular characteristics of interest in a sample substance. The voltages returned by the quad detector 400 are essentially the dot products of the optical interaction of the optically interacted electromagnetic radiation 202, as shown in FIG. 2, with the respective ICEs 402A-402D as functions of the concentrations of the characteristics of interest of the sample substance. As such, the output signals produced by the quad detector 400 and the concentration of the characteristics may be related, for example, directly proportional. In other embodiments, however, the relationship may correspond to a polynomial function, an exponential function, a logarithmic function, and/or a combination thereof.

The ICEs 402A-402D may be manufactured using the method 300 described above with respect to FIG. 3. Further, while the ICEs 402A-402D are depicted as separate elements, it may be appreciated that a single ICE 402 with four sections for measuring four distinct wavelength measurement transmission profiles may be applied over the active areas 404A-404D of the quad detector 400. Further, the active areas 404A-404D of the quad detector 400, which function as the detectors of the quad detector 400, may each be the same type of detector, or the active areas 404A-404D may each be different types of detectors. For example, the quad detector 400 could include two Si detectors (e.g., active areas 404A and 404B) and two InGaAs detectors (e.g., active areas 404C and 404D), each with different relevant ICEs 402A-402D positioned over the active areas 404A-404D. Other combinations of detectors are also contemplated.

In an embodiment, the ICEs 402B-402D, or three of the four measurement sections of the singular ICE 402, may include the thin film layers 102, 104 that modify the optically interacted electromagnetic radiation 202. The ICE 402A, or the fourth measurement section of the singular ICE 402, does not include any thin film layers 102, 104 and does not modify the optically interacted electromagnetic radiation 202. Accordingly, the ICE 402A, or the fourth measurement section of the singular ICE 402, functions as a reference channel. The ICE 402A, in an embodiment, may be made from only the flexible optical substrate 106, or, in other embodiments, the ICE 402A may not actually be present over the active area 404A of the quad detector 400. It may also be appreciated that while the quad detector 400 includes four active areas 404A-404D with four ICEs 402A-402D positioned over the active areas 404A-404D, more or fewer active areas 404 and ICEs 402 are also contemplated within the scope of the present disclosure. Further, while each of the active areas 404 are square and include a width 406 of 1 mm, other active area shapes and dimensions are also contemplated within the scope of the present disclosure. For example, the shape of the active areas 404 and the respective ICEs 402 may be hexagonal or any other suitable shape. Additionally, while four active areas 404A-404D and four ICEs 402A-402D are illustrated, an embodiment of the present disclosure may include more or fewer active areas 404 and ICEs 402.

Figure 4B:
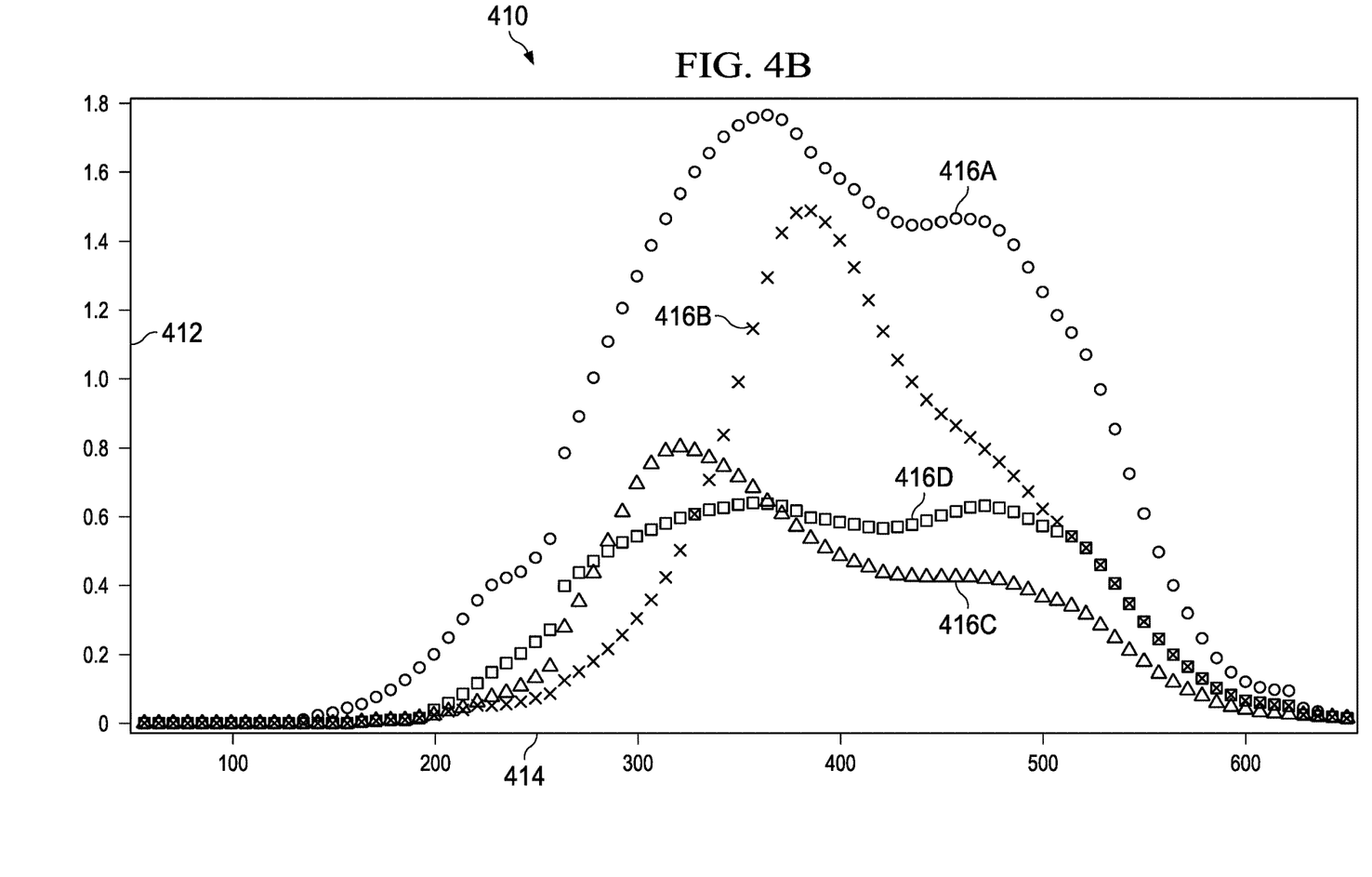
FIG. 4B is a data chart indicating signal intensity measured over a sequence of time by the quad detector of FIG. 4A, in accordance with an embodiment of the disclosure.

Referring to FIG. 4B, a data chart 410 is illustrated indicating signal intensity 412 representative of a wavelength of electromagnetic radiation measured over a sequence of time 414 by the quad detector 400. For example, signal intensities 416A-416D represent the electromagnetic radiation detected by the respective active areas 404A-404D of the quad detector 400. Each of the active areas 404A-404D are tuned to measuring different characteristics of the sample substance by modifying the optically interacted electromagnetic radiation 202 using the ICEs 402A-402D.

As illustrated, the quad detector 400 outputs voltage signals representative of the wavelengths of electromagnetic radiation received at the active areas 404A-404D. These voltage signals are depicted as signal intensities 416A-416D on the data chart 410. In other embodiments, the quad detector 400 may also output current that is representative of the wavelengths of the electromagnetic radiation received at the active areas 404A-404D. Similar to the voltage signal intensities 416A-416D depicted in FIG. 4, the current intensities output by the quad detector 400 may be proportional to the measured wavelengths.

Figure 5:
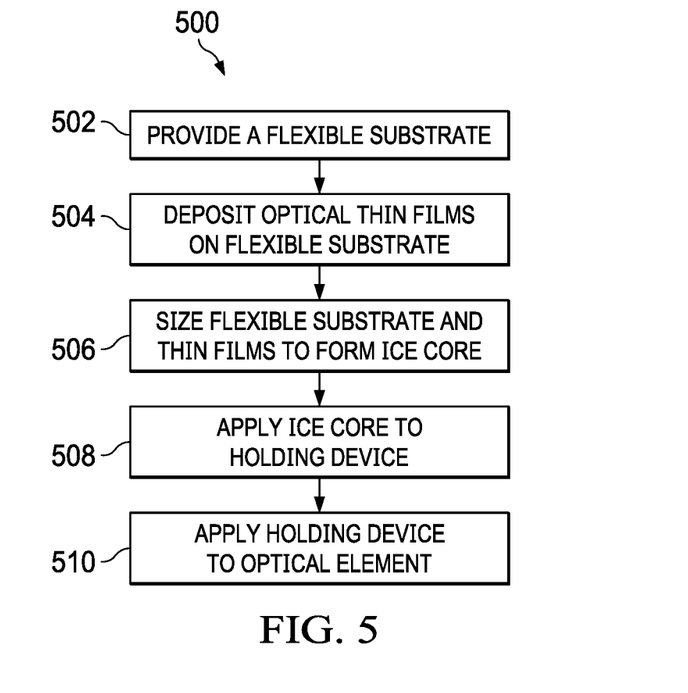
FIG. 5 is a flowchart of a method of manufacturing an optical computing device, in accordance with an embodiment of the disclosure.

FIG. 5 illustrates a method 500 of manufacturing an optical computing device. The optical computing device may generally include the ICEs 100 coupled to an optical element, such as the quad detector 400 described above with respect to FIG. 4, or any other optical element suitable to detect the electromagnetic radiation modified by the ICE 100. Optical processing elements that result from following the method 500 may be substantially similar to the ICE 100 of FIG. 1, and otherwise useful in analyzing a sample substance for an analyte or characteristic of interest associated with the sample substance.

According to the method 500, the flexible optical substrate 106 for the optical processing element may first be provided at block 502. A suitable flexible optical substrate 106 may be a polyimide film, a flexible glass substrate, or any other transparent and flexible material that is capable of withstanding a film deposition process. Preferably, the flexible optical substrate 106 exhibits optical properties that are compliant with the optical bandwidth of interest (i.e., significantly flat and high % transmission profile).

In an embodiment, the flexible optical substrate 106 may include an adhesive layer 107 such that the flexible optical substrate 106 may be efficiently attached and/or removed from an optical element. In other embodiments, the flexible optical substrate 106 may not include the adhesive layer 107.

In such an embodiment, the flexible optical substrate 106 may be attached to a holding device, as described at block 508, using an alternative adhesion technique, such as electrostatic adhesion or magnetic adhesion, or the flexible optical substrate 106 may be attached to the holding device using an adhesive applied to the holding device or the ICE 100 after the ICE 100 is formed.

Once the flexible optical substrate 106 is provided, multiple optical thin film layers 102 and 104 may be deposited on the flexible optical substrate 106 via a thin film deposition process to generate a multilayer film stack device (e.g., the ICE 100) at block 504. In an embodiment, the thin film deposition process may be an atomic layer deposition (ALD) process. However, the thin film deposition process may be any chemical or physical thin film deposition technique including, but not limited to, plating, chemical solution deposition, spin coating, chemical vapor deposition, plasma enhanced chemical vapor deposition, physical vapor deposition, sputtering, pulsed laser deposition, cathodic arc deposition, electrohydrodynamic deposition (i.e., electrospray deposition), and ion-assisted e-beam deposition.

In an embodiment, subjecting the flexible optical substrate 106 to an ALD process, as at block 504, may include introducing the flexible optical substrate 106 into an ALD reaction chamber. The substrate may be positioned within the ALD reaction chamber such that a surface opposite the adhesive layer 107 of the flexible optical substrate 106 is evenly coated during each stage of the deposition process without deposition on the adhesive layer 107.

Once the substrate is suitably arranged within the ALD reaction chamber, the ALD process may then proceed to sequentially (i.e., consecutively) grow the various layers (i.e., layers 102, 104 of FIG. 1) on the flexible optical substrate 106. Briefly, this process includes introducing a first gaseous compound or "precursor" into the ALD reaction chamber to chemically bond to the flexible optical substrate 106; purging or evacuating the ALD reaction chamber to remove any non-reacted precursors and/or gaseous reaction by-products; introducing a second precursor into the ALD reaction chamber to chemically react to the substrate bonded precursor of the previous cycle to form a monolayer; purging or evacuating the ALD reaction chamber to remove any non-reacted precursors and/or gaseous reaction by-products of the second precursor; and repeating the foregoing steps as many times as required for the desired number of layers and the desired thickness of each layer.

Due to self-terminating reactions inherent in ALD processing, ALD is characterized as a surface-controlled process, where the predominant process parameters of control include the precursors (and their flow rates), the substrate, and the ambient temperature inside the ALD reaction chamber. Moreover, because of the surface control that is inherent in ALD processes, the resulting layers deposited on the substrate are extremely conformal and otherwise uniform in thickness on each side of the substrate. It may be appreciated that an ICE 100 including multiple measuring sections (e.g., where each section measures a different characteristic of the sample substance) may be formed during the deposition process by masking different areas of the ICE 100 as the thin film layers 102, 104 are applied to the flexible optical substrate 106. Such a deposition technique may result in an ICE 100 able to measure several different characteristics of the sample substance.

After thin film deposition, sizing the flexible optical substrate 106 and the thin film layers 102, 104 is performed at block 206 to form the ICE 100. In forming the ICE 100, a size of an optical element to which the ICE 100 is eventually applied may be taken into account to determine a desired size of the ICE 100. By way of example, the ICE 100 may be sized to a diameter of approximately 1 mm or smaller. This level of precision may be achieved due to the flexible nature of the flexible optical substrate 106, which avoids the brittleness and/or a lack of clear cleave planes generally associated with inflexible substrates. Further, the sizing may be accomplished using simple tools without sending the ICE 100 to an outside vendor for coring.

The method 500 may further include applying the ICEs 100 to a holding device, as at block 508. The holding device may include an accessory that is easily applied to and removed from an optical element. For example, the holding device may be a cellular telephone case, where the ICEs 100 are positioned on a portion of the holding device that extends over a camera lens of the cellular telephone. In this manner, a picture of a sample substance taken by the cellular telephone will be indicative of characteristic of the sample substance. In other embodiments, the holding device may include a camera lens cap or any other physical structure that is installable over an optical element. Further, the holding device may be made from a material that does not interfere with the modifications of the optically interacted electromagnetic radiation 202 provided by the ICEs 100. Additionally, the ICEs 100 may be applied to the holding device using similar techniques used to apply the ICEs 100 to the optical elements, as described above with respect to block 308 of FIG. 3.

At block 510, the holding device may be applied to the optical element. As discussed above, the holding device may be mechanically secured to the optical element in such a manner that the ICEs 100 cover the optical element. Additionally, an ICE 100 that is fabricated to measure multiple sample substance characteristics may not have the same measurement sections over the same pixels of the optical element every time the holding device is secured to the optical element. Accordingly, part of applying the holding device to the optical element may involve mapping the pixels of the optical element to a particular measurement section of the ICE 100 that is positioned over the specific pixels of the optical element. Further, in an embodiment, multiple pixels that straddle measurement sections of the ICE 100 may be removed from any measurement of the sample substance to avoid inaccurate readings by the optical computing device. Using the method 500, any optical element may be repeatably transformed into a device capable of detecting characteristics of a sample substance. Further, the technology enables any conventional optical detector (i.e., an InGaAs detector, a silicon detector, a thermopile, a GaAs detector, an InP detector, an AlGaAs detector, a PbS detector, a Ge detector, a photomultiplier tube, an avalanche photodiode, a scintillator, a PbSe detector, a bolometer, a charge-coupled device camera, a complementary metal-oxide-semiconductor detector) to be inexpensively and easily modified as a chemical sensor with performance similar to a Fourier-transform infrared (FTIR) spectrometer using partial least square (PLS) analysis.

Figure 6:
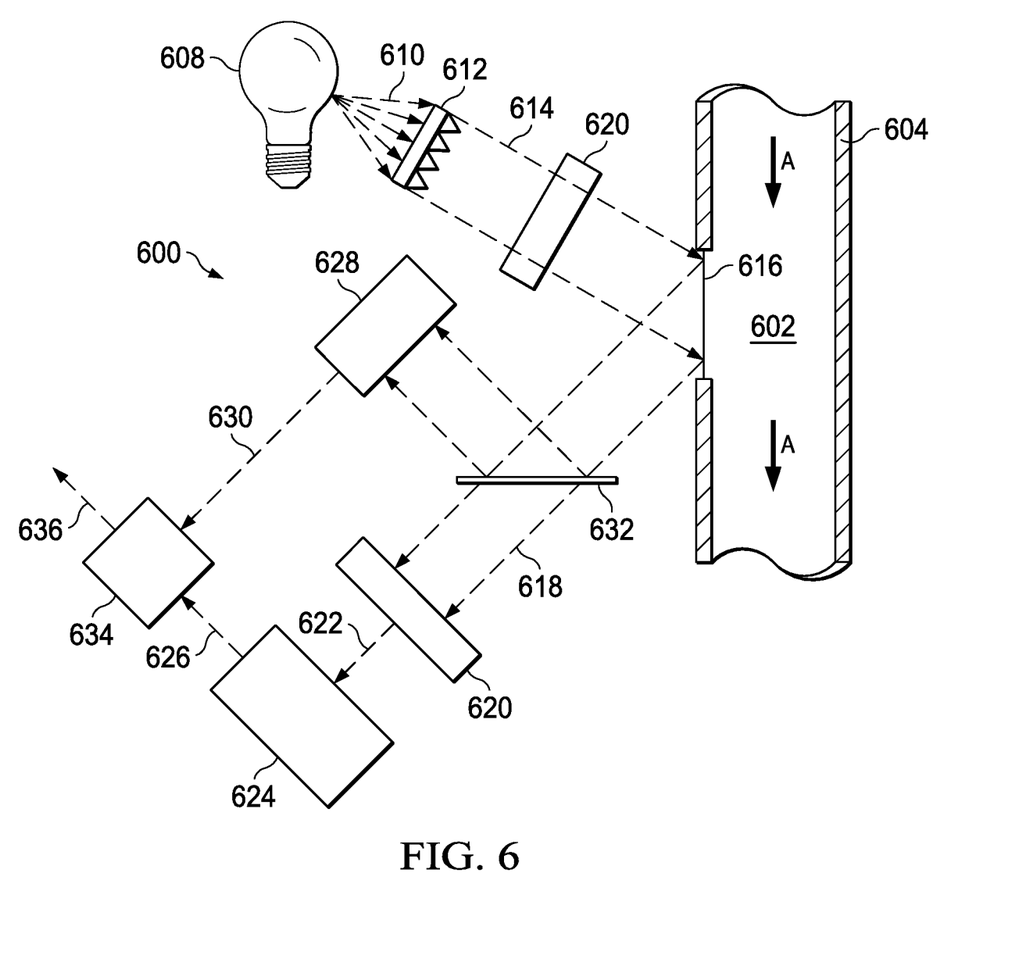
FIG. 6 is an schematic diagram of an optical computing device for monitoring a sample substance, in accordance with an embodiment of the disclosure.

Referring now to FIG. 6, illustrated is an embodiment of an optical computing device 600 for monitoring a sample substance 602. In the illustrated embodiment, the sample substance 602 may be contained or otherwise flowing within an exemplary flow path 604. The flow path 604 may be a flow line, a pipeline, a wellbore, an annulus defined within a wellbore, or any flow lines or pipelines extending to/from a wellbore. The sample substance 602 present within the flow path 604 may be flowing in the general direction indicated by the arrows A (i.e., from upstream to downstream). As will be appreciated, however, the flow path 604 may be any other type of flow path, such as a mud pit (i.e., used for drilling fluids and the like) or any other containment or storage vessel, and the sample substance 602 may not necessarily be flowing in the direction A while the sample substance 602 is being monitored. As such, portions of the flow path 604 may be arranged substantially vertical, substantially horizontal, or any directional configuration therebetween, without departing from the scope of the disclosure.

The optical computing device 600 may determine a characteristic of interest in the sample substance 602 or a component present within the sample substance 602. In some embodiments, the device 600 may include an electromagnetic radiation source 608 configured to emit or otherwise generate electromagnetic radiation 610. The electromagnetic radiation source 608 may be any device capable of emitting or generating electromagnetic radiation, such as, but not limited to, a light bulb, a light emitting diode (LED), a laser, a blackbody, a photonic crystal, an X-Ray source, a supercontinuum light source, a spark emitter, combinations thereof, or the like. In an embodiment, a lens 612 may collect or otherwise receive the electromagnetic radiation 610 and direct a beam 614 of electromagnetic radiation 610 toward the sample substance 602. In other embodiments, the lens 612 may be omitted from the device 600 and the electromagnetic radiation 610 may instead be directed toward the sample substance 602 directly from the electromagnetic radiation source 608.

In an embodiment, the device 600 may also include a sampling window 616 arranged adjacent to or otherwise in contact with the sample substance 602 for detection purposes. The sampling window 616 may be made from a variety of transparent, rigid or semi-rigid materials that are configured to allow transmission of the electromagnetic radiation 610 therethrough. After passing through the sampling window 616, the electromagnetic radiation 610 impinges upon and optically interacts with the sample substance 602, including any components present within the sample substance 602. As a result, optically interacted radiation 618 is generated by and reflected from the sample substance 602. Those skilled in the art, however, will readily recognize that alternative variations of the device 600 may allow the optically interacted radiation 618 to be generated by being transmitted, scattered, diffracted, absorbed, emitted, or re-radiated by and/or from the sample substance 602, without departing from the scope of the disclosure.

The optically interacted radiation 618 generated by the interaction with the sample substance 602 may be directed to or otherwise be received by an ICE 620 arranged within the device 600. The ICE 620 may be a spectral component substantially similar to the ICE 100 described above with reference to FIG. 1 and fabricated using one of the methods 300 or 500 of FIGS. 3 and 5, respectively, as discussed above. Accordingly, in operation the ICE 620 may receive the optically interacted radiation 618 and produce modified electromagnetic radiation 622 corresponding to a particular characteristic of the sample substance 602. In particular, the modified electromagnetic radiation 622 is electromagnetic radiation that has optically interacted with the ICE 620, whereby an approximate mimicking of the regression vector corresponding to the characteristic of the sample substance 602 is obtained.

While FIG. 6 depicts the ICE 620 as receiving reflected electromagnetic radiation from the sample substance 602, the ICE 620 may be arranged at any point along the optical train of the device 600, without departing from the scope of the disclosure. For example, in one or more embodiments, the ICE 620 (as shown in dashed lines) may be arranged within the optical train prior to the sampling window 616 and equally obtain substantially the same results. Moreover, in other embodiments, the ICE 620 may generate the modified electromagnetic radiation 622 through reflection, instead of transmission therethrough.

The modified electromagnetic radiation 622 generated by the ICE 620 may subsequently be conveyed to a detector 624 for quantification of the signal. The detector 624 may be any device capable of detecting electromagnetic radiation, and may be generally characterized as an optical transducer. In some embodiments, the detector 624 may be, but is not limited to, a thermal detector such as a thermopile or photoacoustic detector, a semiconductor detector, a piezoelectric detector, a charge coupled device (CCD) detector, a video or array detector, a split detector, a photon detector (such as a photomultiplier tube), photodiodes, combinations thereof, or the like, or any other suitable detectors.

In some embodiments, the detector 624 may be configured to produce an output signal 626 in real-time or near real-time in the form of a voltage (or current) that corresponds to the particular characteristic of interest in the sample substance 602. The voltage returned by the detector 624 is essentially the dot product of the optical interaction of the optically interacted radiation 618 with the respective ICE 620 as a function of the concentration of the characteristic of interest of the sample substance 602. As such, the output signal 626 produced by the detector 624 and the concentration of the characteristic may be related, for example, directly proportional. In other embodiments, however, the relationship may correspond to a polynomial function, an exponential function, a logarithmic function, and/or a combination thereof.

In some embodiments, the device 600 may include a second detector 628, which may be similar to the first detector 624 in that it may be any device capable of detecting electromagnetic radiation. The second detector 628 may be used to detect radiating deviations stemming from the electromagnetic radiation source 608. Undesirable radiating deviations can occur in the intensity of the electromagnetic radiation 610 due to a wide variety of reasons and potentially causing various negative effects on the device 600. These negative effects can be particularly detrimental for measurements taken over a period of time. In some embodiments, radiating deviations can occur as a result of a build-up of film or material on the sampling window 616 which has the effect of reducing the amount and quality of light ultimately reaching the first detector 624. Without proper compensation, such radiating deviations could result in false readings and the output signal 626 would no longer be primarily or accurately related to the characteristic of interest.

To compensate for these types of undesirable effects, the second detector 628 may generate a compensating signal 630 generally indicative of the radiating deviations of the electromagnetic radiation source 608, and thereby normalize the output signal 626 generated by the first detector 624. As illustrated, the second detector 628 may be configured to receive a portion of the optically interacted radiation 618 via a beamsplitter 632 to detect the radiating deviations. In other embodiments, however, the second detector 628 may be arranged to receive electromagnetic radiation from any portion of the optical train in the device 600 to detect the radiating deviations, without departing from the scope of the disclosure.

In some applications, the output signal 626 and the compensating signal 630 may be conveyed to or otherwise received by a signal processor 634 communicably coupled to both the detectors 624, 628. The signal processor 634 may be a computer including a processor and a machine-readable storage medium having instructions stored thereon, which, when executed by the processor 634, cause the optical computing device 600 to perform a number of operations, such as determining a characteristic of interest of the sample substance 602. For instance, the concentration of each characteristic detected with the optical computing device 600 can be fed into an algorithm operated by the signal processor 634. The algorithm can be part of an artificial neural network that uses the concentration of each detected characteristic to evaluate the overall characteristics or quality of the sample substance 602.

The signal processor 634 may also computationally combine the compensating signal 630 with the output signal 626 to normalize the output signal 626 in view of any radiating deviations detected by the second detector 628. In real-time or near real-time, the signal processor 634 may provide a resulting output signal 636 corresponding to a concentration of the characteristic of interest in the sample substance 602.

Figure 7:
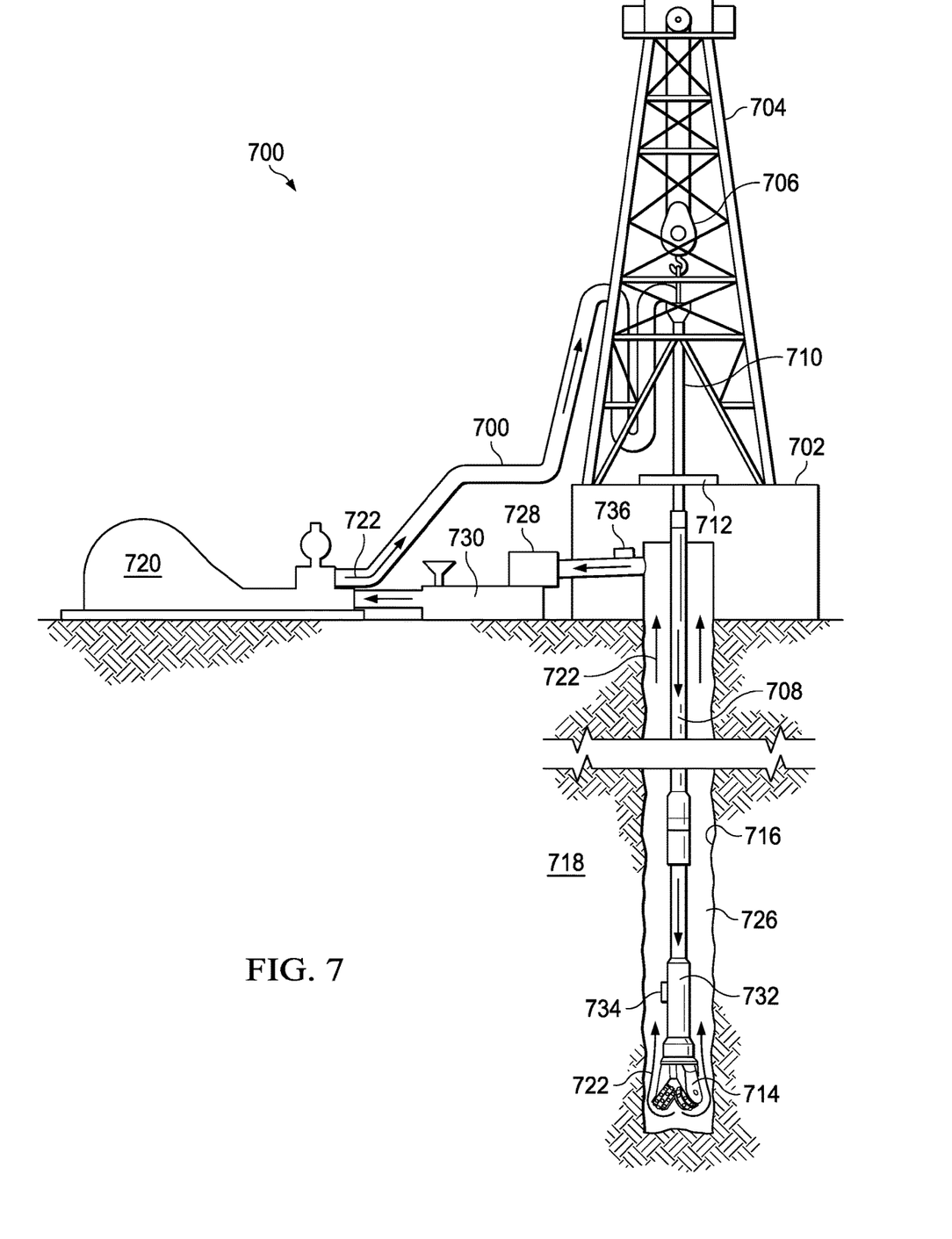
FIG. 7 is a schematic illustration of a wellbore drilling assembly that may employ one or more optical computing devices for monitoring a downhole substance, in accordance with an embodiment of the disclosure.

Referring now to FIG. 7, with continued reference to FIG. 6, illustrated is an exemplary wellbore drilling assembly 700 that may employ the optical computing device 600 of FIG. 6, including the ICE 620, in order to monitor a drilling operation, according to one or more embodiments. The drilling assembly 700 may include a drilling platform 702 that supports a derrick 704 having a traveling block 706 for raising and lowering a drill string 708. A kelly 710 supports the drill string 708 as it is lowered through a rotary bit 714. A drill bit 714 is attached to the distal end of the drill string 708 and is driven either by a downhole motor and/or via rotation of the drill string 708 from the well surface. As the bit 714 rotates, it creates a borehole 716 that penetrates various subterranean formations 718.

A pump 720 (e.g., a mud pump) circulates drilling fluid 722 through a feed pipe 724 and to the kelly 710, which conveys the drilling fluid 722 downhole through an interior conduit defined in the drill string 708 and through one or more orifices in the drill bit 714. The drilling fluid 722 is then circulated back to the surface via an annulus 726 defined between the drill string 708 and the walls of the borehole 716. At the surface, the recirculated or spent drilling fluid 722 exits the annulus 726 and may be conveyed to one or more solids control equipment 728 via an interconnecting flow line and subsequently to a retention pit 730. The drilling fluid 722 may then be recirculated back downhole via the pump 720.

A bottom hole assembly (BHA) 732 may be in in the drill string 708 at or near the drill bit 714. The BHA 732 may include any of a number of sensor modules, which may include formation evaluation sensors and directional sensors, such as measuring-while-drilling and/or logging-while-drilling tools. The BHA 732 may further include at least one optical computing device 734, similar to the optical computing device 600 of FIG. 6. The optical computing device 734 may be configured to monitor the drilling fluid 722 within the annulus 726 as it returns to the surface. The optical computing device 734 may include at least one ICE (not shown) substantially similar to the ICEs 100, 600 described above and fabricated using one of the methods 300 or 500 of FIGS. 3 and 5, respectively, as discussed above. In some embodiments, the drilling assembly 700 may further include another optical computing device 736 arranged to monitor the drilling fluid 722 as it is recirculated or otherwise exits out of the borehole 716. The optical computing device 734 may also include at least one ICE (not shown) substantially similar to the ICEs 100, 600 described above and fabricated using one of the methods 300 or 500 of FIGS. 3 and 5, respectively, as discussed above.

While the optical computing devices 734, 736 are depicted as being used in conjunction with the drilling assembly 700, it will be appreciated that one or both of the optical computing devices 734, 736 may be used in conjunction with several other downhole tools in obtaining a variety of downhole measurements. For instance, the optical computing devices 734, 736 may be used in conjunction with, but not limited to, a sampling tool of a wireline application, a measurement device associated with production tubing, etc., without departing from the scope of the disclosure.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowchart depicts a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, an integrated computing element for an optical computing device, comprising: a flexible optical substrate; at least one optical thin film deposited on a first surface of the flexible optical substrate, wherein the at least one optical thin film is configured to selectively pass fractions of electromagnetic radiation at different wavelengths.

Clause 2, the integrated computing element of clause 1, comprising: an optical detector configured to detect the electromagnetic radiation, wherein the optical detector is covered by the flexible optical substrate and the at least one optical thin film.

Clause 3, the integrated computing element of clause 1 or 2, wherein the flexible optical substrate comprises an adhesive layer on a second surface of the flexible optical substrate opposite the first surface.

Clause 4, the integrated computing element of at least one of clauses 1-3, wherein the flexible optical substrate comprises a transparent adhesive film.

Clause 5, the integrated computing element of at least one of clauses 1-4, wherein the flexible optical substrate comprises a polyimide film that remains stable at a temperature of up to 400 degrees Celsius.

Clause 6, the integrated computing element of at least one of clauses 1-5, wherein the at least one optical thin film comprises a layer of a semiconductor thin film.

Clause 7, the integrated computing element of at least one of clauses 1-6, wherein the at least one optical thin film comprises at least two different measurement sections, wherein the at least two different measurement sections each selectively pass different transmission profiles of the electromagnetic radiation.

Clause 8, the integrated computing element of at least one of clauses 1-7, comprising an optical detector with at least two active areas, wherein the at least two different measurement sections of the at least one optical thin film cover the at least two active areas of the optical detector.

Clause 9, the integrated computing element of at least one of clauses 1-8, wherein the at least two different measurement sections of the at least one optical thin film are positioned over a single optical detector.

Clause 10, the integrated computing element of at least one of clauses 1-9, wherein the integrated computing element comprises a diameter of less than or equal to 1 millimeter.

Clause 11, a method of manufacturing an optical computing device, comprising: providing a flexible optical substrate; depositing at least one optical thin film on a first surface of the flexible optical substrate, wherein the at least one optical thin film is configured to selectively pass fractions of electromagnetic radiation at different wavelengths; and securing the flexible optical substrate and the at least one optical thin film to an optical detector configured to detect the electromagnetic radiation.

Clause 12, the method of clause 11, wherein the flexible optical substrate is secured to the optical detector using an adhesive layer disposed on a second surface of the flexible optical substrate.

Clause 13, the method of clause 11 or 12, wherein the flexible substrate comprises a transparent adhesive film, a transparent non-adhesive film, or a flexible glass substrate.

Clause 14, the method of at least one of clauses 11-13, wherein the optical detector comprises an InGaAs detector, a silicon detector, a thermopile, a GaAs detector, an InP detector, an AlGaAs detector, a PbS detector, a Ge detector, a photomultiplier tube, an avalanche photodiode, a scintillator, a PbSe detector, a bolometer, a charge-coupled device detector, a complementary metal-oxide-semiconductor detector, or any combination thereof.

Clause 15, the method of at least one of clauses 11-14, comprising sizing the flexible optical substrate and the at least one optical thin film to fit over the optical detector.

Clause 16, an optical computing device, comprising: an electromagnetic radiation source configured to emit electromagnetic radiation; an integrated computing element configured to selectively pass fractions of the electromagnetic radiation emitted by the electromagnetic radiation source at different transmission profiles, the integrated computing element comprising: a flexible substrate; and an optical detector configured to detect the electromagnetic radiation, wherein the optical detector is covered by the flexible substrate.

Clause 17, the optical computing device of clause 16, wherein the electromagnetic radiation source comprises a light bulb, a light emitting diode, a laser, a blackbody, a photonic crystal, an X-ray source, a supercontinuum light source, a spark emitter, or any combination thereof.

Clause 18, the optical computing device of clause 16 or 17, wherein the flexible substrate comprises an adhesive layer configured to couple the integrated computing element to the optical detector.

Clause 19, the optical computing device of at least one of clauses 16-18, wherein the integrated computing element comprises at least one optical thin film deposited on a first surface of the flexible substrate.

Clause 20, the optical computing device of at least one of clauses 16-19, wherein the integrated computing element is a reflection multivariate optical element.

While this specification provides specific details related to integrated computing elements and optical computing devices, it may be appreciated that the list of components is illustrative only and is not intended to be exhaustive or limited to the forms disclosed. Other components related to the optical computing devices will be apparent to those of ordinary skill in the art without departing from the scope and spirit of the disclosure. Further, the scope of the claims is intended to broadly cover the disclosed components and any such components that are apparent to those of ordinary skill in the art.

It should be apparent from the foregoing disclosure of illustrative embodiments that significant advantages have been provided. The illustrative embodiments are not limited solely to the descriptions and illustrations included herein and are instead capable of various changes and modifications without departing from the spirit of the disclosure.

What is claimed is:

1. An integrated computing element for an optical computing device, comprising:
    a flexible optical substrate having a first surface and a second surface opposite the first surface; and
    at least one flexible optical thin film that is deposited onto the flexible optical substrate via at least one of an atomic layer deposition process, a chemical thin film deposition technique, or a physical thin film deposition technique, wherein the second surface of the flexible optical substrate is removably attached to an adhesive layer, and wherein the at least one optical thin film is configured to selectively pass fractions of electromagnetic radiation at different wavelengths.

2. The integrated computing element of claim 1, comprising:
    an optical detector configured to detect the electromagnetic radiation, wherein the optical detector is covered by the flexible optical substrate and the at least one optical thin film.

3. The integrated computing element of claim 1, wherein the flexible optical substrate comprises an adhesive layer on a second surface of the flexible optical substrate opposite the first surface.

4. The integrated computing element of claim 1, wherein the flexible optical substrate comprises a transparent adhesive film.

5. The integrated computing element of claim 1, wherein the flexible optical substrate comprises a tape that remains stable at a temperature of up to 400 degrees Celsius.

6. The integrated computing element of claim 1, wherein the at least one optical thin film comprises a layer of a semiconductor thin film.

7. The integrated computing element of claim 1, wherein the at least one optical thin film comprises at least two different measurement sections, wherein the at least two different measurement sections each selectively pass different transmission profiles of the electromagnetic radiation.

8. The integrated computing element of claim 7, comprising an optical detector with at least two active areas, wherein the at least two different measurement sections of the at least one optical thin film cover the at least two active areas of the optical detector.

9. The integrated computing element of claim 7, wherein the at least two different measurement sections of the at least one optical thin film are positioned over a single optical detector.

10. The integrated computing element of claim 1, wherein the integrated computing element comprises a diameter of less than or equal to 1 millimeter.

11. A method of manufacturing an optical computing device, comprising:
    providing a flexible optical substrate having a first surface and a second surface opposite the first surface;
    depositing at least one flexible optical thin film on a first surface of the flexible optical substrate via at least one of an atomic layer deposition process, a chemical thin film deposition technique, or a physical thin film deposition technique, wherein the at least one optical thin film is configured to selectively pass fractions of electromagnetic radiation at different wavelengths; and
    securing the flexible optical substrate and the at least one optical thin film to an optical detector configured to detect the electromagnetic radiation, wherein the second surface of the flexible optical substrate is removably attached to an adhesive layer after being secured to the optical detector.

12. The method of claim 11, wherein the flexible optical substrate is affixed over the optical detector using an adhesive layer disposed on a second surface of the flexible optical substrate.

13. The method of claim 11, wherein the flexible substrate comprises a transparent adhesive film, a transparent non-adhesive film, or a flexible glass substrate.

14. The method of claim 11, wherein the optical detector comprises an InGaAs detector, a silicon detector, a thermopile, a GaAs detector, an InP detector, an AlGaAs detector, a PbS detector, a Ge detector, a photomultiplier tube, an avalanche photodiode, a scintillator, a PbSe detector, a bolometer, a charge-coupled device detector, a complementary metal-oxide-semiconductor detector, or any combination thereof.

15. The method of claim 11, comprising sizing the flexible optical substrate and the at least one optical thin film to fit over the optical detector.

16. An optical computing device, comprising:
    an electromagnetic radiation source configured to emit electromagnetic radiation;
    an integrated computing element configured to selectively pass fractions of the electromagnetic radiation emitted by the electromagnetic radiation source at different transmission profiles, the integrated computing element comprising:
        a flexible optical substrate having a first surface and a second surface opposite the first surface, the second surface being removably attached to an adhesive layer;
        at least one flexible optical thin film deposited on the first surface of the flexible substrate; and an optical detector configured to detect the electromagnetic radiation, wherein the optical detector is covered by the flexible optical substrate, wherein the optical detector is removably attached to the integrating computing element.

17. The optical computing device of claim 16, wherein the electromagnetic radiation source comprises a light bulb, a light emitting diode, a laser, a blackbody, a photonic crystal, an X-ray source, a supercontinuum light source, a spark emitter, or any combination thereof.

18. The optical computing device of claim 16, wherein the flexible substrate comprises an adhesive layer configured to couple the integrated computing element to the optical detector.

19. The optical computing device of claim 16, wherein the integrated computing element is a reflection multivariate optical element.

* * * * *